Oct. 27, 1953 | A. J. RACK | 2,657,318

ELECTRONIC SWITCH

Filed March 22, 1952 | 2 Sheets-Sheet 1

INVENTOR
A. J. RACK
BY Harry C. Hart
ATTORNEY

ELECTRONIC SWITCH

Filed March 22, 1952 2 Sheets-Sheet 2

INVENTOR
A. J. RACK
BY Harry C. Hart
ATTORNEY

Patented Oct. 27, 1953 2,657,318

UNITED STATES PATENT OFFICE 2,657,318

ELECTRONIC SWITCH

Alois J. Rack, Millington, N. J., assignor to Bell Telephone Laboratories, Incorporated, New York, N. Y., a corporation of New York Application March 22, 1952, Serial No. 277,939

6 Claims. (Cl. 307—88)

This invention relates to the rapid transfer of electric energy from an input circuit to a load circuit.

Apparatus for effecting such an energy transfer under control of an auxiliary signal has come to be known as an electronic switch or gate circuit. Compact and rugged apparatus of this character are dealt with in Lewis Patent 2,535,303 and in Meacham Patent 2,576,026. Briefly, such a gate circuit comprises a T-network having an input series arm, an output series arm, a shunt control arm and an asymmetrically conducting device connected in each arm and forming the major part of this impedance. Like electrodes of these three asymmetrically conducting devices are connected together. Under one condition of the control voltage applied to the shunt arm, its impedance is high while the impedances of both series arms are low. Under this condition, a low resistance path is established between the energy source connected to the input series arm and a load connected to the input series arm and a load connected to the output series arm and the gate is closed. Under the other condition of control voltage applied to the shunt arm, the shunt impedance is low while both series impedances are high. The source is then virtually disconnected from the load and the gate is open.

It is convenient to employ a number of such T-networks together as apparatus for multiplexing signals on a time division basis in a common load. The channels to be multiplexed are connected individually to the series arm of the several gate circuits and control pulses are applied to the shunt arms in rapid succession. It has been found, however, that at and above a limiting frequency of the order of 100 kilocycles per second or so for the gating pulse repetition rate, serious crosstalk sometimes exists between adjacent channels; and this crosstalk has been traced to delay in the completion of the relaxation of the output diodes of the several T-networks, hereinafter termed "sluggishness."

In the present specification and appended claims, the term "asymmetrically conducting device" refers to any of the well-known devices which present a relatively low impedance to applied voltages of one polarity and a relatively high impedance to voltages of the opposite polarity so that they permit substantial conduction in but one direction therethrough. Examples of such devices are silicon and germanium crystal rectifiers or diodes. As it is well known that such devices have non-ohmic impedance characteristics, they will not be described in detail herein.

The principal object of the invention is to accelerate the operation of a T-network electronic switch or gate and a related object is to enable the employment of a number of such gates in connection with a common load without mutual interference.

These objects are attained in accordance with the present invention by the addition of a fourth asymmetrically conducting device connected between a fixed potential point such as ground and the output terminal of the T-network. Like electrodes of this fourth diode and of the output series arm diode, for example their cathodes, are connected together. With this arrangement, the operation in the presence of the gating pulse is unaltered while, when the gating pulse is removed, a low resistance path is established from the anode of the output diode to its cathode by way of which any charge which may have accumulated in the output diode while the gating pulse was applied is rapidly dissipated. When each of a number of T-networks is provided with such an additional diode, they may all be connected to a common load and operated in rapid succession without danger of mutual interference or crosstalk.

The invention will be fully apprehended from the following detailed description of preferred embodiments thereof taken in connection with the appended schematic circuit diagrams in the drawings of which:

Figure 1:
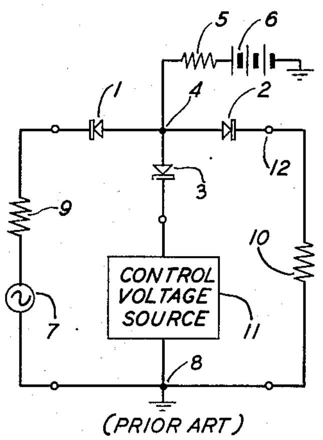
Fig. 1 shows a conventional T-network electronic switch.

Referring now to the drawings, Fig. 1 shows an electronic switch as disclosed in Meacham Patent 2,576,026, and there described in full detail. It comprises a T-network of three arms, namely, an input series arm, an output series arm, and a shunt arm. Each of these arms contains an asymmetrically conducting device such as a germanium point contact rectifier. Such devices will hereinafter be designated "diodes" for the sake of brevity. Like electrodes of these diodes 1, 2, 3, for example their anodes, are connected together, and to a common point 4 of the T-network which is in turn connected by way of a resistor 5 to the positive terminal of a potential source such as a battery 6, whose negative terminal is grounded. A source 7 of energy which is to be transferred is connected from a fixed potential point 8 such as ground to the cathode of the input series arm diode 1, preferably by way of a resistor 9. A load 10 to which the energy of the source 7 is to be transferred is connected from the fixed potential point 8 to the output terminal 12 of the switch, and so to the cathode of the output series arm diode 2. For best operation the impedance of the load is preferably intermediate between the low resistances of the series arm diodes 1, 2 and their high resistances. More precisely, the resistors 5, 9, 10 are proportioned relatively to each other and to the magnitude of the battery 6 as taught in the Meacham patent above referred to. A control voltage source 11 is connected from the fixed potential point 8 to the cathode of the shunt arm diode 3.

Briefly, the operation of this electronic switch is as follows. Application of a positive voltage pulse from the control voltage source 11 to the cathode of the shunt arm diode 3 drives it into its high resistance condition. The junction point 4 of the T-network is then virtually isolated from ground and adopts a potential governed by the positive terminal of the battery 6. This in turn drives both of the series diodes 1, 2, into their low resistance conditions. The signal source 7 is now connected by way of an impedance of negligible magnitude to the load 10. Upon removal of the positive control voltage pulse, the shunt diode 3 is drawn into its low resistance condition. The junction point 4 of the T-network is now effectively connected to ground at 8, and this in turn drives the series diodes 1, 2 into their high resistance conditions. The source 7 is now virtually isolated from the load 10 and the switch is now open.

It has been determined in practice that there is an upper limit to the frequency with which successive control voltage pulses may be repeated without severe reduction in the positiveness of the operation of the switch of Fig. 1. When it is attempted to exceed this limit, the output series diode 2 behaves sluggishly. In particular, having been driven into its low resistance condition by the application of a positive control pulse, it does not instantaneously return to its high resistance condition on removal of the control pulse of the source 11. Rather, it relaxes gradually as though a substantial electric charge were stored in it, and a current flows in the load 10 due to this relaxation. When control voltage pulses are applied with sufficient rapidity the output diode 2 remains virtually continuously in its low resistance condition, in which event the required gating operation of the circuit is not performed.

Figure 2:
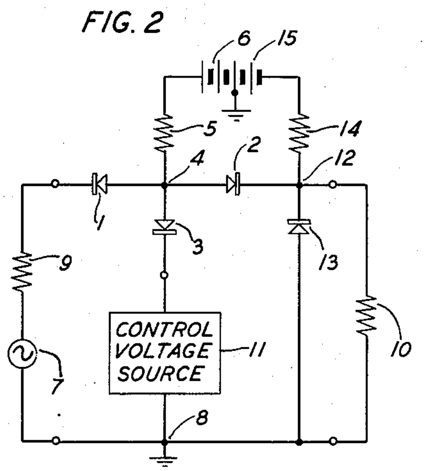
(PRIOR ART) FIG. 2
Fig. 2 shows the improved electronic switch of the invention in a simple form.

It has been discovered that by the addition as shown in Fig. 2, of a fourth diode 13 connected between ground at 8 and the output terminal 12 of the T-network, and poled as shown i. e., like electrodes of this fourth diode 13 and of the output series diode 2 being connected together, the aforesaid sluggishness of operation is greatly reduced.

In addition, the output terminal 12 is preferably connected by way of a resistor 14 to the negative terminal of a source 15 whose positive terminal is grounded. The potential sources 6 and 15 may of course be merged into a single one of which an intermediate potential point is grounded. The magnitudes of the resistors 5, 9, 10, 14 and of the positive source 6 and the negative source 15 are selected to hold the output terminal, in the absence of signals and control pulses, at a slightly negative potential.

Without necessary subscription to any particular theory, it is believed that the operation of the improved circuit is now as follows. When the control pulse is applied to the shunt diode 3 by actuation of the control voltage source 11, the junction point 4 of the T-network rises rapidly toward the potential of the positive terminal of the battery 6 to close the gate between the source 9 and the load 10 as described above. The additional diode 13 is now in its high resistance condition and has no effect. Positive charges are believed now to be stored in the output series diode 2 while it is held in its low resistance condition. As soon, however, as the control voltage pulse of the source 11 is removed, the output terminal 12 of the T-network falls to the potential of the negative terminal of the battery 15 and the fourth diode 13 enters its low resistance condition. Any charges which may be stored in the output diode 2 are now much more rapidly discharged by way of the path comprising the shunt diode 3 and the fourth diode 13 in series than would have been possible by way of the much higher impedance of the load 10. Thus the addition of the fourth diode 13 makes for an increase in the frequency of satisfactory operation of about five fold.

The addition of the fourth diode 13, the resistor 14 and battery 15 require a modification in the mathematical relation which is set forth in the Meacham patent as determining the limits of best operation. The modified relation which holds between the elements of Fig. 2 is $$-\left[E_1\frac{R_1}{R_3}+E_2\frac{R_2(R_1+R_3)}{R_3(R_2+R_4)}\right]<e<\left[\frac{E_1R_2R_4-E_2R_2R_3}{R_3(R_2+R_4)+R_2R_4}\right]$$

where $e$ is the peak magnitude of the voltage of the source 7,
$E_1$ is the voltage of positive source 6,
$E_2$ is the voltage of negative source 15,
$R_1$ is the magnitude of input resistor 9,
$R_2$ is the magnitude of output resistor 10,
$R_3$ is the magnitude of resistor 5, and
$R_4$ is the magnitude of resistor 14.

The polarity of the elements of Fig. 2 is selected for operation with positive control pulses. For negative control pulses the polarities of all diodes and those of the potential sources 6 and 15 need only to be reversed.

Figure 3:
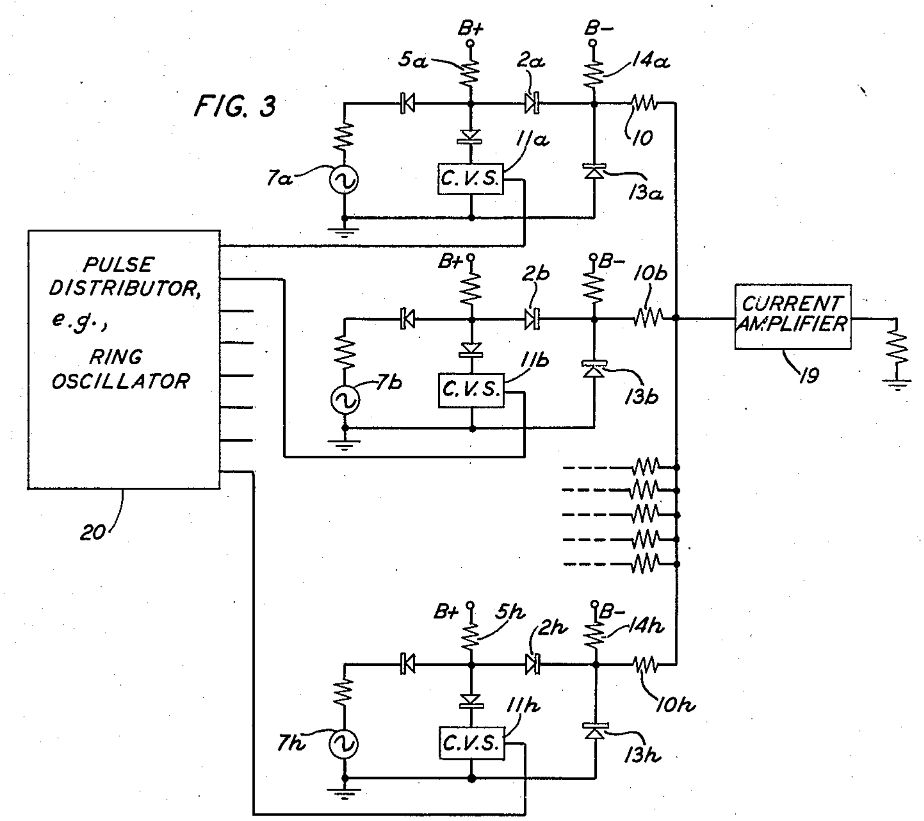
Fig. 3 shows a multiplex distributor employing a number of the electronic switches of the invention supplying a common load.

Fig. 3 shows a group of electronic switches which together feed a common current amplifier 19 by way of individual resistors 10 which now serve as buffers rather than loads. Thus each switch of the group comprises the same basic T-network diode switch as that of Fig. 2, including the auxiliary discharging diode 13 of the present invention, with the exception of the fact that the load on each switch comprises its buffer resistor 10 and the common amplifier 19. If the auxiliary discharging diode 13 were omitted, the discharge path for the output diode 2 of each switch would be by way of its buffer resistor 10 and, for a reasonable discharge speed, this would require that the magnitudes of the buffer resistors 10 not be great. However, now that the auxiliary discharge diode 13 has been provided, establishing a low resistance discharge path for each output diode 2, the buffer resistors 10 may be considerably greater in magnitude, for example, ten thousand ohms each. These large buffer resistors serve additionally to isolate each switch from the others. Viewed in this light, the auxiliary diode 13 may be regarded as a decoupling element and the combined effects of the low resistance discharge paths which they provide and the high resistance buffer resistors 10 results in a reduction of crosstalk as between adjacent channels of the order of 40-50 decibels.

Control voltage pulses may be applied in rapid succession to the several switches. They may be derived from individual pulse generators 11, tripped by or synchronized with the outputs of the several stages of a ring oscillator 20 or they may be derived directly from such a sequential pulse source in well-known fashion. By virtue of the great reduction of crosstalk provided as described above, the control voltage pulses may be applied to the individual switches of the group in very rapid succession, for example at a pulse repetition rate of one megacycle per second or more which allows a generous margin for all known time division multiplex systems.

The current input to the amplifier 19 now consists at any instant of the current output from one electronic switch of the group and never from two or more.

Figure 4:
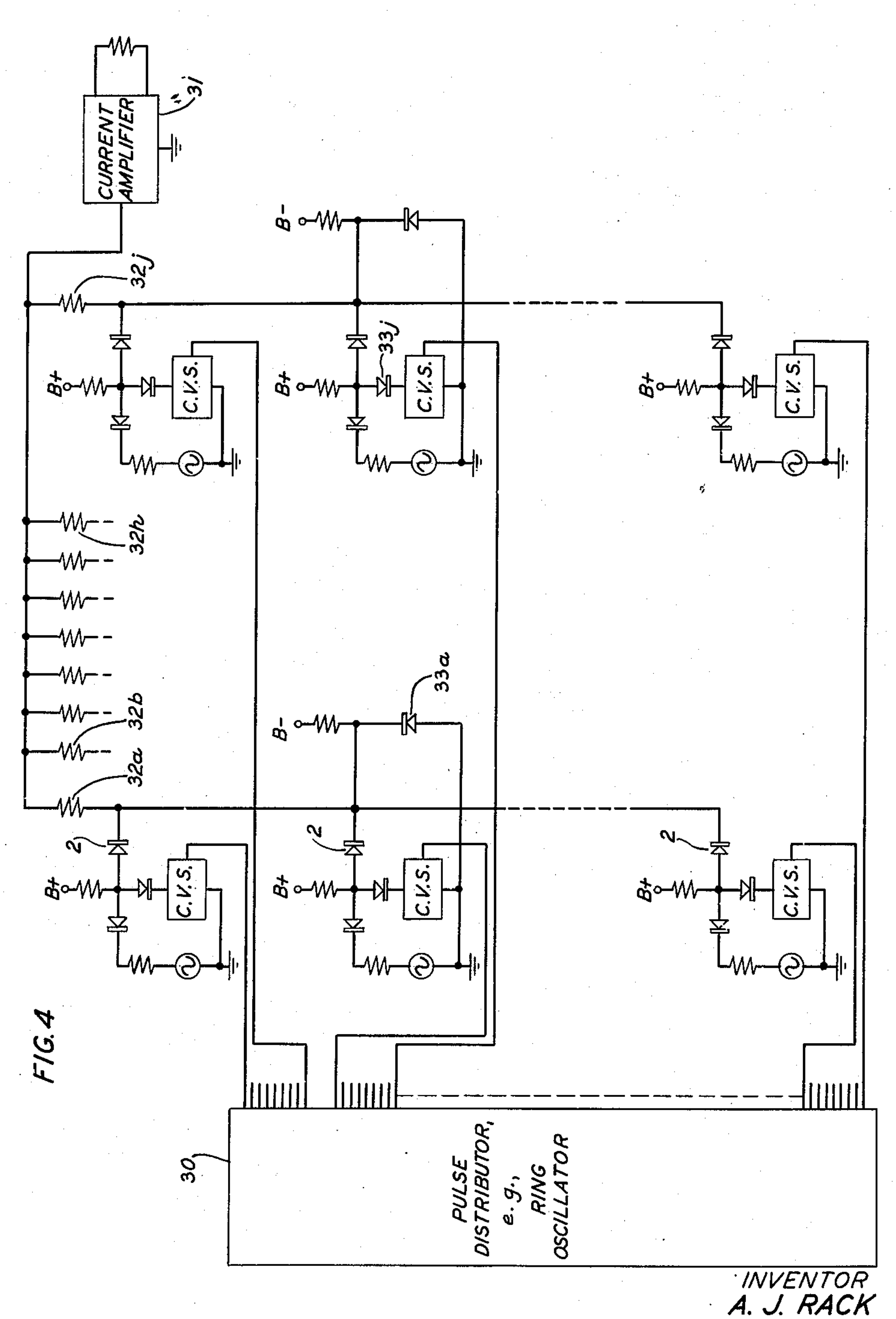
Fig. 4 shows a more complex multiplex system in which a number of switch groups are applied to a common load, the switches of each group being arranged in a different fashion.

Some nine or ten of the switches of Fig. 2 may be connected together to feed a common current amplifier as shown in Fig. 3. However, if it were attempted greatly to increase this number and connect one hundred or so switches to the common current amplifier of Fig. 3, then, for the operation of each switch, the amplifier load would be shunted by ninety-nine buffer resistors 10 in parallel. Such an arrangement would place excessive requirements on the common current amplifier which it might be difficult to meet. Accordingly, when it is desired to multiplex channels in such large numbers, it is preferred to apply to the common amplifier a comparatively small number of individual switch groups, each of which may in turn comprise a comparatively small number of individual switches. Such an arrangement of switch groups is shown in Fig. 4 where, by way of example, nine groups of eight switches each are applied together to the common current amplifier 31, there being a single buffer resistor 32 and a single fourth diode 33 for all the switches of one group. Because all the output terminals of the switches of each group are connected together, a single discharging diode 33 may serve for all of them, operating to discharge the diodes 2 of the output series arms of each of the switches of one group in turn as described above in connection with Fig. 3.

For best operation, the switches of the first row, one in each vertical group, should be actuated in immediate succession. To this end the individual pulse generators are to be understood as being connected to adjacent output points of the ring oscillator 30, those of the switches of each vertical group being thus connected to non-adjacent terminals of the ring oscillator, for example, the first, the ninth, the seventeenth, etc. When the cycle has been completed with respect to the switches of the first row, it may start for the switches of the second row, run to completion, start for the switches of the third row and so on. At the same time, and by virtue of the connection only of the several switch groups individually to the current amplifier 31, the shunting effect on any one of the buffer resistors by all the others is not serious.

What is claimed is:

1. An electronic switch which comprises a T-network having an input series arm having an input terminal, an output series arm having an output terminal, a shunt control arm, a point common to said arms, and a fixed potential point, an asymmetrically conducting device connected in each of said arms, electrodes of said devices which are of a kind being connected to said common point, and a fourth asymmetrically conducting device interconnecting said output terminal with said fixed potential point, electrodes of the output series arm device and of the fourth device which are of the other kind being connected together, each of said devices having a high impedance condition and a low impedance condition, and means for causing said fourth device to adopt its high impedance condition when said output series arm device adopts its low impedance condition, and vice versa.

2. The combination of an electronic switch which comprises a T-network having an input series arm having an input terminal, an output series arm having an output terminal, a shunt control arm, a point common to said arms, and a fixed potential point, an asymmetrically conducting device connected in each of said arms, electrodes of said devices which are of a kind being connected to said common point, and a fourth asymmetrically conducting device interconnecting said output terminal with said fixed potential point, electrodes of the output series arm device and of the fourth device which are of the other kind being connected together, with a source of steady potential having a positive terminal and a negative terminal, an intermediate point of said source being connected to said fixed potential point, a first resistor interconnecting the common point of said T-network with the positive terminal of said source, and a second resistor of magnitude substantially in excess of that of the first resistor interconnecting the output terminal of the T-network with the negative terminal of said source.

3. The combination of an electronic switch which comprises a T-network having an input series arm having an input terminal, an output series arm having an output terminal, a shunt control arm, a point common to said arms, and a fixed potential point, an asymmetrically conducting device connected in each of said arms, electrodes of said devices which are of a kind being connected to said common point, and a fourth asymmetrically conducting device interconnecting said output terminal with said fixed potential point, electrodes of the output series arm device and of the fourth device which are of the other kind being connected together, with a source of signals to be translated and a first resistor connected in series between said fixed potential point and said input terminal, a second resistor connected between said fixed potential point and said output terminal, a source of steady potential having a positive terminal, a negative terminal, and a terminal of intermediate potential, said intermediate potential terminal being connected to said fixed potential point, a third resistor interconnecting the common point of said T-network with the positive terminal of said source, and a fourth resistor interconnecting said output terminal with the negative terminal of said source.

4. Apparatus as defined in claim 3 wherein the magnitudes of said resistors, the potentials of said sources and the voltage of said signal source are proportioned in accordance with the relation $$-\left[E_1+\frac{R_1}{R_3}+E_2\frac{R_2(R_1+R_3)}{R_3(R_2+R_4)}\right]<e<\left[\frac{E_1R_2R_4-E_2R_2R_3}{R_3(R_2+R_4)R_2R_4}\right]$$

where $e$=peak magnitude of the voltage of the signal source, $E_1$=potential of the positive portion of the potential source, $E_2$=potential of negative portion of the potential source, $R_1$=magnitude of the first resistor, $R_2$=magnitude of the second resistor, $R_3$=magnitude of the third resistor, and $R_4$=magnitude of the fourth resistor.

5. Apparatus which comprises a plurality of electronic switches, each of which comprises a T-network having an input series arm, an output series arm having an output terminal, a shunt control arm, a point common to said arms, and a fixed potential point, an asymmetrically conducting device connected in each of said arms, electrodes of said devices which are of a kind being connected to said common point, and a fourth asymmetrically conducting device interconnecting said output terminal with said fixed potential point, electrodes of the output series arm device and of the fourth device which are of the other kind being connected together, a common current amplifier having an input terminal, resistors of substantial magnitude individually connecting the output terminal of the several T-networks with the input terminal of said amplifier.

6. Apparatus which comprises a plurality of electronic switches each of which comprises a T-network having an input arm, and output series arm having an output terminal, a shunt control arm, a point common to said arms, and a fixed potential point, an asymmetrically conducting device connected in each of said arms, electrodes of said devices which are of a kind being connected to said common point, a common current amplifier having an input terminal, a resistor, the output of all of said switches being connected together and by way of said resistor to the input terminal of said amplifier, and an auxiliary asymmetrically conducting device interconnecting said output terminals with said fixed potential point, electrodes of the output series arm devices and of said auxiliary device which are of the other kind being connected together.

ALOIS J. RACK.

References Cited in the file of this patent

UNITED STATES PATENTS

| Number | Name | Date |
|---|---|---|
| 2,476,066 | Rochester | July 12, 1944 |
| 2,535,303 | Lewis | Dec 26, 1950 |